(12) United States Patent
Dyer

(10) Patent No.: US 10,792,591 B2
(45) Date of Patent: Oct. 6, 2020

(54) OXYGEN REMOVAL UNIT WITH TORTUOUS PATH

(71) Applicant: Hamilton Sundstrand Corporation, Charlotte, NC (US)

(72) Inventor: Gerald P. Dyer, Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 230 days.

(21) Appl. No.: 15/962,220

(22) Filed: Apr. 25, 2018

(65) Prior Publication Data

US 2019/0329158 A1   Oct. 31, 2019

(51) Int. Cl.
*B01D 19/00* (2006.01)
*B01D 69/04* (2006.01)
(Continued)

(52) U.S. Cl.
CPC ..... *B01D 19/0036* (2013.01); *B01D 19/0031* (2013.01); *B01D 69/04* (2013.01);
(Continued)

(58) Field of Classification Search
CPC .......... B01D 19/0031; B01D 19/0036; B01D 53/22; B01D 69/04; B01D 69/08;
(Continued)

(56) References Cited

U.S. PATENT DOCUMENTS 5,352,361 A * 10/1994 Prasad ................... B01D 53/22
                                                          210/321.81
5,938,922 A *  8/1999 Fulk, Jr. ............. B01D 19/0031
                                                          210/321.81

(Continued)

FOREIGN PATENT DOCUMENTS

EP          0554567        8/1993
EP          1544437        6/2005

OTHER PUBLICATIONS

Degassing of liquids—CMS, Compact Membrane Systems, https://compactmembrane.com/degassing, Mar. 2018.
(Continued)

*Primary Examiner* — Jason M Greene
(74) *Attorney, Agent, or Firm* — Carlson, Gaskey & Olds, P.C.

(57) ABSTRACT

A gas removal unit has a tube bundle formed of a plurality of tubes with a hollow center. The tubes are formed of a material that allows passage of a gas from an exterior of the tube into an interior of the tube and resists flow of at least some liquids through the tube into the interior of the tube. There is a plurality of inner chambers within the bundle and a plurality of outer chambers outward of the bundle. A fluid inlet connects to a first of the inner or outer chambers and a fluid outlet connects to a second of the inner and outer chambers. An axial direction is defined between the fluid inlet to the fluid outlet. A tortuous path is defined by the inner and outer chambers such that a fluid will pass repeatedly from the inner chambers to the outer chambers, and from the outer chambers to the inner chambers, as it moves along the axial direction from the fluid inlet to the fluid outlet. A fuel supply system is also disclosed.

17 Claims, 2 Drawing Sheets

(51) Int. Cl.
*F23K 5/08* (2006.01)
*F02C 7/22* (2006.01)

(52) U.S. Cl.
CPC .............. *F02C 7/22* (2013.01); *F23K 5/08* (2013.01); *B01D 2257/104* (2013.01); *B01D 2325/027* (2013.01)

(58) Field of Classification Search
CPC ..... B01D 2257/104; F02C 7/22; B64D 37/34; C07C 7/144; F23K 5/08
See application file for complete search history.

(56) References Cited

U.S. PATENT DOCUMENTS

| | | | | |
|---|---|---|---|---|
| 6,149,817 A | * | 11/2000 | Peterson | B01D 19/0031 210/321.78 |
| 6,315,815 B1 | | 11/2001 | Spadaccini et al. | |
| 2002/0195385 A1 | * | 12/2002 | Cho | B01D 19/0031 210/321.83 |
| 2005/0137441 A1 | * | 6/2005 | Cordatos | B01D 19/0031 585/818 |
| 2006/0254422 A1 | * | 11/2006 | Spadaccini | B01D 19/0031 96/6 |
| 2009/0020013 A1 | | 1/2009 | Sloan | |
| 2011/0036240 A1 | | 2/2011 | Taylor et al. | |
| 2012/0137879 A1 | * | 6/2012 | Taylor | B01D 19/0031 95/46 |
| 2017/0234280 A1 | | 8/2017 | Habib et al. | |

OTHER PUBLICATIONS

The Extended European Search Report for EP Application No. 19171137.3, dated Aug. 8, 2019.

* cited by examiner

OXYGEN REMOVAL UNIT WITH TORTUOUS PATH

BACKGROUND

This application relates to an oxygen removal unit for fuel supply systems, such as utilized with aircraft engines.

Aircraft engines typically include a fuel supply system which supplies fuel to a combustor in a gas turbine engine. The fuel often entrains oxygen. The dissolved oxygen within the hydrocarbon fuel may react at elevated temperatures to form free radicals such as coke precursors that may lead to the formation of deposits. These deposits may clog fuel filters, injectors, or other fuel system components.

As such, it is known to provide an oxygen removal unit in the path of fuel passing from a fuel tank to the gas turbine engine combustor.

One known type oxygen removal unit utilizes tube-shaped fibers.

Oxygen can pass through the walls of the tube and then be removed, such as by a vacuum. Fuel will pass over the tubes and can be delivered in a more oxygen free state to the combustor.

SUMMARY

A gas removal unit has a tube bundle formed of a plurality of tubes with a hollow center. The tubes are formed of a material that allows passage of a gas from an exterior of the tube into an interior of the tube and resists flow of at least some liquids through the tube into the interior of the tube. There is a plurality of inner chambers within the bundle and a plurality of outer chambers outward of the bundle. A fluid inlet connects to a first of the inner or outer chambers and a fluid outlet connects to a second of the inner and outer chambers. An axial direction is defined between the fluid inlet to the fluid outlet. A tortuous path is defined by the inner and outer chambers such that a fluid will pass repeatedly from the inner chambers to the outer chambers, and from the outer chambers to the inner chambers, as it moves along the axial direction from the fluid inlet to the fluid outlet.

A fuel supply system is also disclosed.

These and other features may be best understood from the following drawings and specification.

DETAILED DESCRIPTION

Figure 1:
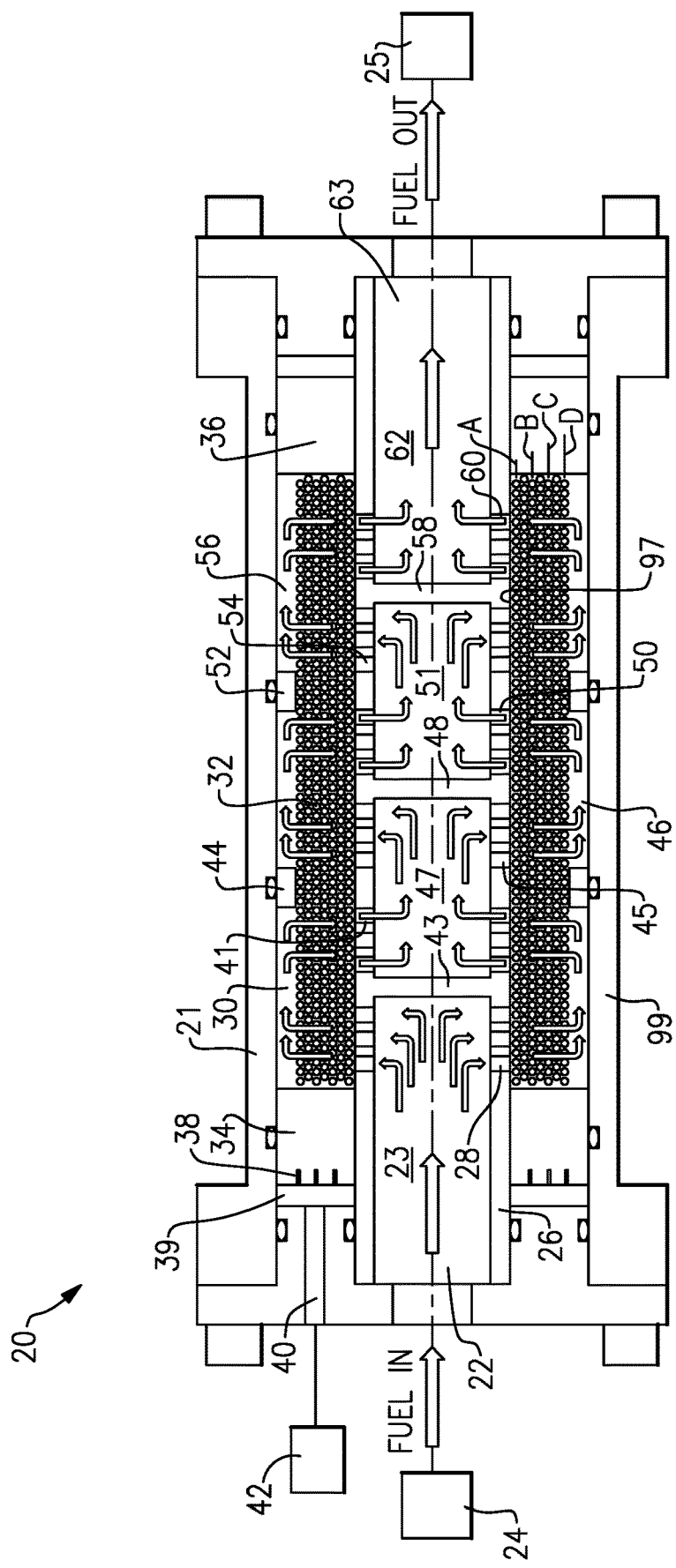
FIG. 1 schematically shows a cross-section through an oxygen removal unit.

FIG. 1 shows a fuel supply system 20 including an oxygen removal unit 21. Fuel from a fuel tank 24 enters an inlet 22 defined by a hollow mandrel 26. The fuel passes along a flow path, as will be described, and leaves the unit 21 via outlet 63, possibly to be delivered to a combustor 25 such as in a gas turbine engine.

As shown, the fuel enters into a first chamber 23 within the mandrel 26 and then passes outwardly through openings 28 in the hollow mandrel 26 into a second chamber 30. The tube bundle 32 has a hollow center 97 receiving the hollow mandrel 26. A bundle of tubes 32 are placed radially outwardly of the hollow mandrel 26. Thus, the fuel passes over the tube bundle 32.

There are a plurality of layers of tubes, labeled A, B, C and D, extending in a radially outer direction. While the mandrel 26 may be cylindrical, other shapes may be utilized. However, the tube bundle 32 is placed outwardly of the mandrel 26 as illustrated. Closing portions 34 and 36, possibly made of epoxy, are formed at ends of the bundle 32. It should be understood the tubes 38 are formed within the epoxy portions 34 and 36. Also, ends 38 of the tubes in bundle 32 are shown schematically in the epoxy area 34. Those ends 38 communicate with a vacuum chamber 39 leading to a passage 40 into a vacuum source 42.

As the fuel passes over the bundle 32, oxygen passes inwardly into the tubes and is removed by the vacuum source 42.

The mandrel 26 has an inner baffle 43 separating chamber 23 from a chamber 47. Passages 41 in mandrel 26 allow the fuel to pass back across bundle 32 and into chamber 47. That fuel then passes back outwardly through openings 45 across bundle 32 and into a chamber 46. As shown, a baffle 44 separates chambers 30 and 46. The fuel in chamber 46 now passes back inward of openings 50 into a chamber 51.

Chamber 51 is maintained separate from chamber 46 by a baffle 48. From chambers 51, the fuel passes back outwardly through openings 54, across the bundle 32, and into a chamber 56. Chamber 56 is maintained separate from chamber 46 by a baffle 52. An outer housing 99 surrounds the tube bundle 32 but is spaced to define the outer chambers.

Fuel in the chamber 56 passes inwardly through openings 60 into a chamber 62, and may then be delivered to the combustor 25 through an outlet 63.

While inlet 22 and outlet 63 are both connected to inner chambers, either, or both, could be connected to outer chambers.

The tube bundle may be selectively permeable membrane tubes. One example type is available from Compact Membrane Systems (www.compactmembranes.com) and may be a non-porous perfluoropolymer membrane. Dissolved oxygen passes through a tube wall and into an interior, while fuel passes over the tubes. Of course, other permeable membrane tubes come within the scope of this disclosure.

Figure 2:
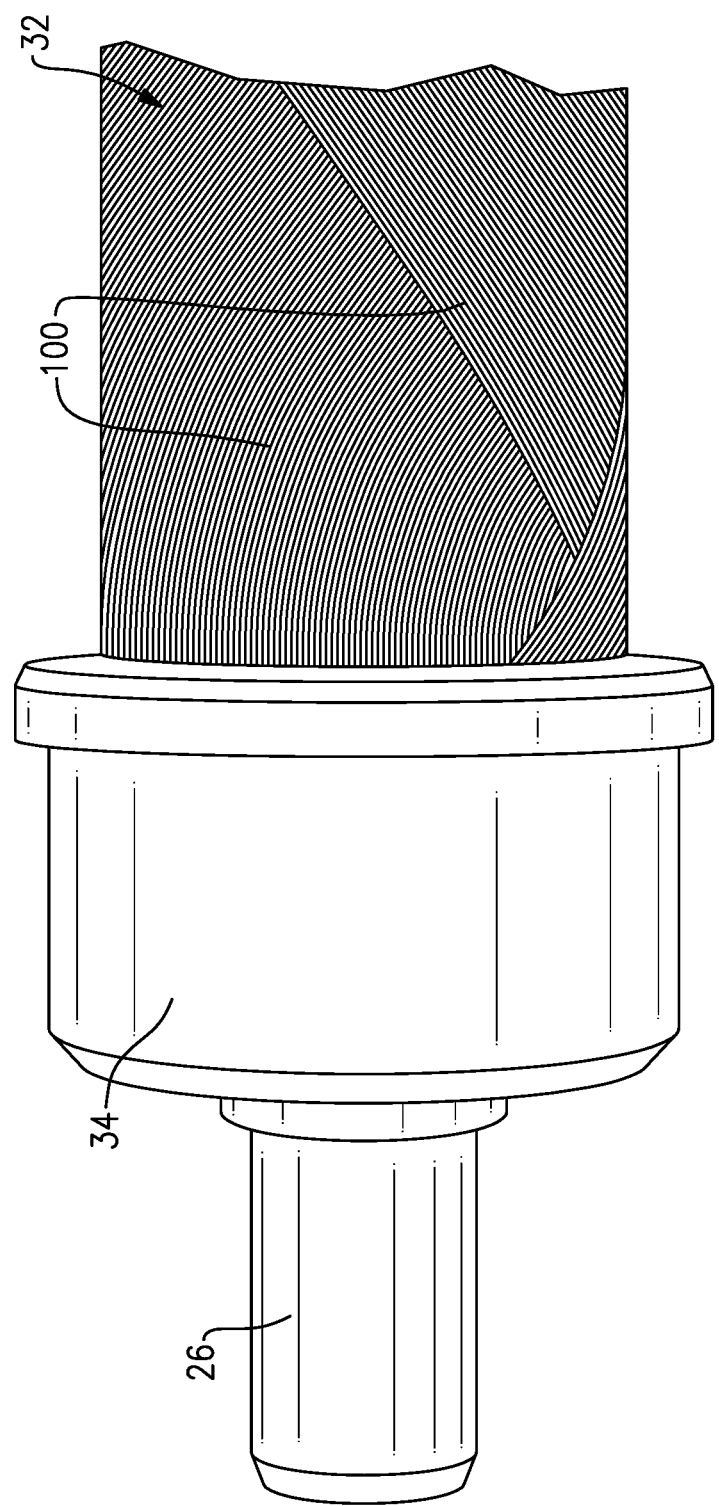
FIG. 2 shows a detail of the oxygen removal unit.

As shown in FIG. 2, the tube bundle 32 is shown associated with the epoxy portion 34 and a portion of the mandrel 26. As can be appreciated, the several layers are wrapped around each other and at a varying angle 100. The angle 100 could be defined as not be parallel to a center axis of the tube bundle, and measured relative to the center axis, or in an axial direction. This "stacking" of the several layers provides resistance to fuel flow along an axial direction defined between chamber 23 and chamber 62. However, as can be appreciated, the tubes are spaced from each other, although, layered tightly around each other. In this manner, the fuel can flow in inner and outer radial directions, as illustrated with regard to FIG. 1.

By arranging the several baffles, as illustrated, for example, in FIG. 1, it is ensured that the fuel repeatedly passes over the bundle to provide very efficient oxygen removal in a relatively small envelope.

A gas removal unit could be said to have a tube bundle with a hollow center. The bundle extends from an inner layer of tubes outwardly to an outer layer of tubes, such that there are a plurality of layers of tubes. The tubes are formed of a material that allows passage of a gas from outward of the tubes into an interior of the tubes, and resisting flow of at least some liquids through the tubes into the interior of the tubes. A plurality of inner chambers are within the bundle and a plurality of outer chambers are outward of the bundle.

A fluid inlet is connected to a first of the inner or outer chambers, and a fluid outlet is connected to a second of the inner and outer chambers. An axial direction is defined between the fluid inlet to the fluid outlet. A tortuous path is defined between the first and second of the inner and outer chambers. A fluid will pass repeatedly from the inner chambers to the outer chambers, and from the outer chambers to the inner chambers as it moves along an axial path from the fluid inlet to the fluid outlet. The outer baffles are in contact with an outer surface of the tube bundle. The tube bundle passes within the outer baffles, defining the plurality of outer chambers.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas removal unit comprising:
   a tube bundle formed of a plurality of tubes and having a hollow center, said tubes being formed of a material that allows passage of a gas from exterior of said tubes into an interior of said tubes, and resisting flow of at least some liquids through said tubes into said an interior of said tubes;
   a plurality of inner chambers within said tube bundle and a plurality of outer chambers outward of said tube bundle;
   a fluid inlet connected to a first of said inner or outer chambers, and a fluid outlet connected to a second of said inner and outer chambers, and an axial direction defined between said fluid inlet to said fluid outlet;
   a tortuous path defined between said first and second of said inner and outer chambers such that a fluid will pass repeatedly from said inner chambers to said outer chambers, and from said outer chambers to said inner chambers as it moves along said axial direction from said fluid inlet to said fluid outlet;
   wherein there is an inner layer of said tubes extending outwardly to an outer layer of said tubes, such that there are a plurality of layers of tubes;
   wherein said plurality of layers of tubes are wrapped at an angle relative to said axial direction, such that said tube bundle resists flow in the axial direction, said angle being non-parallel to a central axis of said tube bundle; and
   wherein said angle varies across said plurality of layers.

2. The gas removal unit as set forth in claim 1, wherein both said first and second of said inner and outer chambers are inner chambers.

3. The gas removal unit as set forth in claim 1, wherein a hollow mandrel is positioned within said tube bundle and has a cylindrical outer periphery, such that said inner and outer chambers are radially spaced.

4. The gas removal unit as set forth in claim 3, wherein said hollow mandrel has a plurality of passages, such that the fluid is confined to flow from said inner chambers radially outwardly across said tube bundle into said outer chambers, and then radially inwardly across said tube bundle through other passages in said hollow mandrel into said inner chambers.

5. The gas removal unit as set forth in claim 1, wherein said plurality of inner chambers are separated within said hollow center by a plurality of inner baffles.

6. The gas removal unit as set forth in claim 5, wherein there are outer baffles separating said plurality of outer chambers, and said outer baffles are in contact with an outer surface of said tube bundle, such that said tube bundle passes within said outer baffles, defining said plurality of outer chambers.

7. The gas removal unit as set forth in claim 6, wherein an outer housing surrounds said tube bundle, but spaced from said tube bundle to define said outer chambers.

8. The gas removal unit as set forth in claim 1, wherein an end of said tube bundle is connected to a vacuum chamber.

9. A fuel supply system comprising:
   a fuel source;
   an oxygen removal unit with a tube bundle having a hollow center said tubes being formed of a material that allows passage of a gas from an exterior of said tubes into an interior of said tubes, and resisting flow of at least some liquids through said tubes into said interior of said tubes;
   a plurality of inner chamber within said bundle and a plurality of outer chambers outward of said bundle;
   a fluid inlet connected to a first of said inner or outer chambers, and a fluid outlet connected to a second of said inner and outer chambers, and an axial direction defined between said fluid inlet to said fluid outlet;
   a tortuous path defined between said first and second of said inner and outer chambers such that a fluid will pass repeatedly from said inner chambers to said outer chambers, and from said outer chambers to said inner chambers as it moves along said axial direction from said fluid inlet to said fluid outlet;
   wherein there is an inner layer of said tubes outwardly to an outer layer of said tubes, such that there are a plurality of layers of said tubes;
   wherein said plurality of layers of tubes are wrapped at an angle relative to said axial direction, such that said tube bundle resists flow in the axial direction, said angle being non-parallel to a central axis of said tube bundle; and
   wherein said angle varies across said plurality of layers.

10. The fuel supply system as set forth in claim 9, wherein both said first and said second of said inner chambers are inner chambers.

11. The fuel supply system as set forth in claim 9, wherein a hollow mandrel is positioned within said tube bundle and has a cylindrical outer periphery, such that said inner and outer chambers are radially spaced.

12. The fuel supply system as set forth in claim 11, wherein said hollow mandrel has a plurality of passages, such that the fluid is confined to flow from said inner chambers radially outwardly across said tube bundle into said outer chambers, and then radially inwardly across said tube bundle through other passages in said hollow mandrel into said inner chambers.

13. The fuel supply system as set forth in claim 9, wherein said plurality of inner chambers are separated within said hollow center by a plurality of inner baffles.

14. The fuel supply system as set forth in claim 12, wherein there are outer baffles separating said plurality of outer chambers, and said outer baffles are in contact with an outer surface of said tube bundle, such that said tube bundle passes within said outer baffles, defining said plurality of outer chambers.

15. The fuel supply system as set forth in claim 14, wherein an outer housing surrounds said tube bundle, but spaced from said tube bundle to define said outer chambers.

16. The fuel supply system as set forth in claim 9, wherein an end of said tube bundle is connected to a vacuum chamber.

17. A gas removal unit comprising:
a tube bundle formed of a plurality of tubes and having a hollow center, said tubes being formed of a material that allows passage of a gas from exterior of said tubes into an interior of said tubes, and resisting flow of at least some liquids through said tubes into said an interior of said tubes;
a plurality of inner chambers within said tube bundle and a plurality of outer chambers outward of said tube bundle;
a fluid inlet connected to a first of said inner or outer chambers, and a fluid outlet connected to a second of said inner and outer chambers, and an axial direction defined between said fluid inlet to said fluid outlet;
a tortuous path defined between said first and second of said inner and outer chambers such that a fluid will pass repeatedly from said inner chambers to said outer chambers, and from said outer chambers to said inner chambers as it moves along said axial direction from said fluid inlet to said fluid outlet;
wherein said plurality of inner chambers are separated within said hollow center by a plurality of inner baffles; and
wherein there are outer baffles separating said plurality of outer chambers, and said outer baffles are in contact with an outer surface of said tube bundle, such that said tube bundle passes within said outer baffles, defining said plurality of outer chambers.

\* \* \* \* \*